July 21, 1953      J. W. DIBRELL      2,645,854
INSTRUMENT FOR DRAWING ELLIPSES AND RELATED FIGURES
Filed April 6, 1950      2 Sheets-Sheet 2
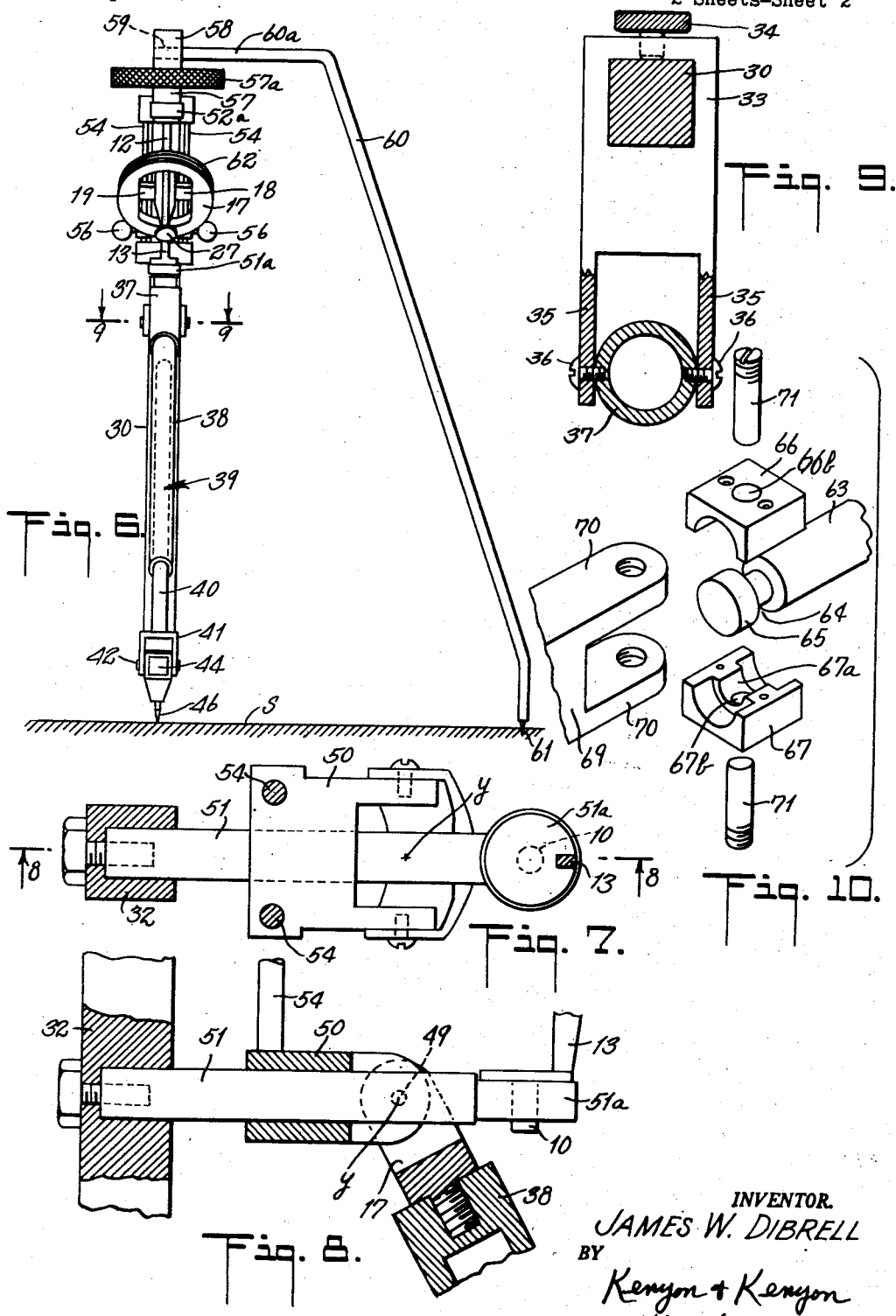
INVENTOR.
JAMES W. DIBRELL
BY
Kenyon & Kenyon
HIS ATTORNEYS Patented July 21, 1953

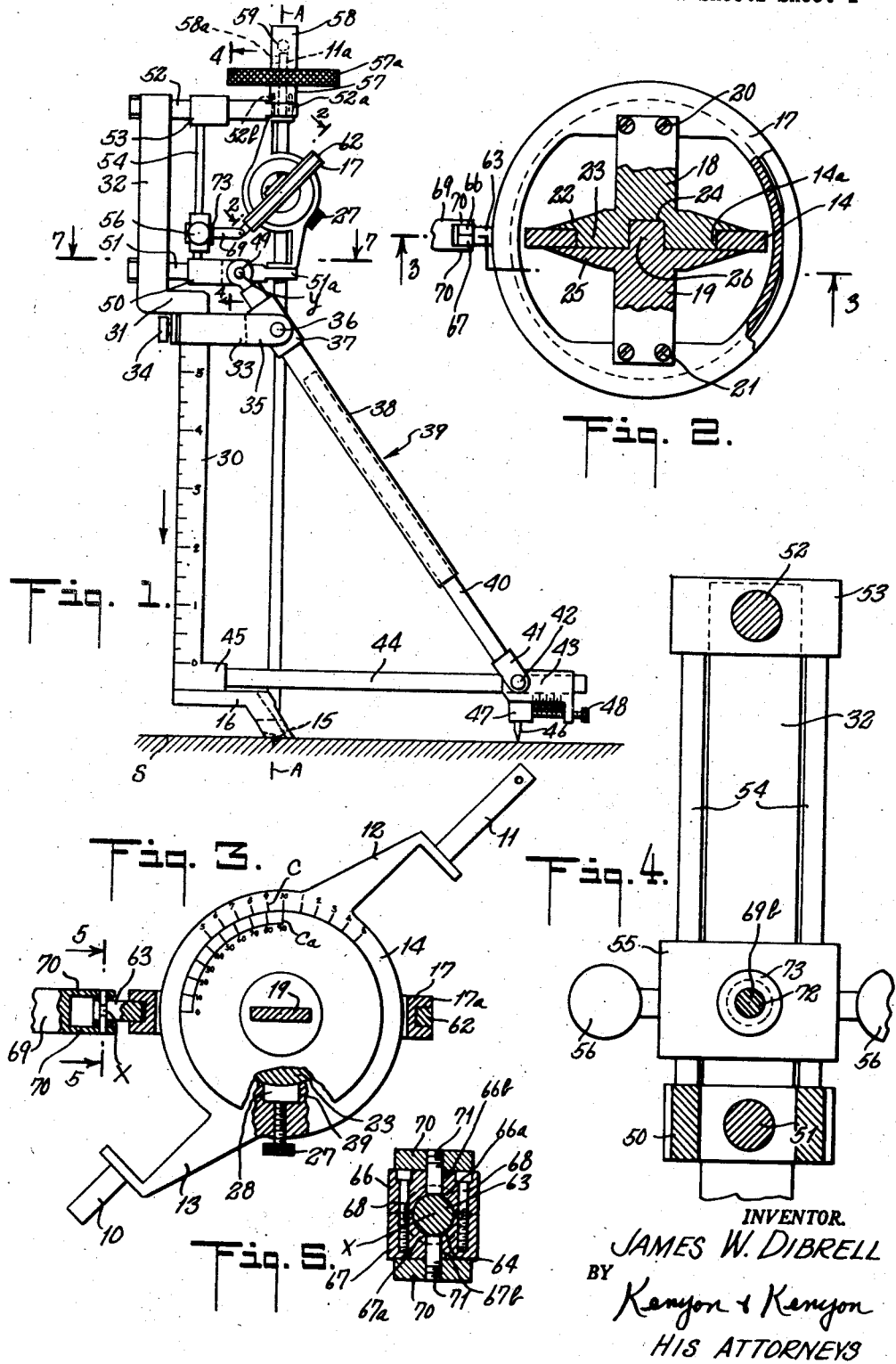

2,645,854

UNITED STATES PATENT OFFICE 2,645,854

INSTRUMENT FOR DRAWING ELLIPSES AND RELATED FIGURES

James W. Dibrell, Brooklyn, N. Y.

Application April 6, 1950, Serial No. 154,247

15 Claims. (Cl. 33—30)

This invention relates to drawing instruments and more particularly to an instrument of this kind for drawing ellipses and related figures.

Theoretically operable ellipse drawing instruments or machines may be designed in several generically different forms. This invention is of that class which mechanically projects a circle onto a plane which is at an adjustable angle to the plane of the circle.

This invention utilizes a novel basic structure in achieving a true projection of a circle and amplification of the projected ellipse, and this basic structure as far as is known is the first in the art which makes possible the design of an ellipse drawing instrument combining the necessary flexibility and range of adjustment, and the necessary simplicity and ease of operation, with a manufacturing cost which will permit successful marketing of such an instrument.

The more important objects and features achieved by this invention, which, as far as is known, either have not been adequately achieved, or have not been achieved by instruments having a practical basic structure in prior art, are:

The development of a drawing instrument which will describe perfect ellipses, and certain desired related figures, with an ease of operation comparable to that of a simple drawing compass.

The development of a drawing instrument for the purpose of readily drawing ellipses and related figures which can be simply, continuously, accurately and positively adjusted over a wide range of major axis lengths (for example, and not by way of limitation, from ⅛ inch or less minimum to 6 inches maximum in a 6 inch high instrument, or to 18 inches maximum in an 11 inch high instrument, etc.).

The development of an instrument for drawing ellipses and related figures which has a sufficiently simple basic structure that it can be manufactured at a cost which will permit development of the known potentially large market for such a device.

The development of an instrument for drawing ellipses and related figures which provides a sufficiently wide range of continuous adjustments to give the draftsman or artist complete freedom in choosing perspective, and which is small, compact, light and simple enough to be completely practical for general use.

The development of an instrument for drawing ellipses and related figures which provides unusual ease and accuracy in setting the major axis length by positioning on a large scale calibrated rod a single piece clamped in the desired position by a single thumb screw, and in which the angle of view (ratio of major to minor axis lengths) can be set with unusual ease by rotating a single calibrated piece against a vernier scale, the latter piece having sufficient radius to permit easily accurate setting, and being clamped in position by a single thumbscrew; which simplicity and accuracy of adjustments are made possible only by the unique basic structure and the design of the associated parts of the instrument.

The development of an instrument for drawing ellipses and related figures which is similar in appearance and in use to a standard drawing compass, so that a draftsman or artist will not have to master a new and/or intricate operating procedure in order to use the instrument.

The development of an instrument for drawing ellipses and related figures which has basic structural and functional characteristics such that it can be easily designed to provide any desired range of major axis lengths, without the size, weight or cost of the instrument becoming disproportionately great.

Other advantages and novel features of the invention will become apparent from the following description and the accompanying drawings, wherein:

Fig. 1 is an elevational view in position of use of an instrument embodying the invention;

Fig. 2 is a sectional view on an enlarged scale taken along line 2—2 of Fig. 1;

Fig. 3 is a sectional view taken along line 3—3 of Fig. 2;

Fig. 4 is a sectional view on an enlarged scale taken along line 4—4 of Fig. 1;

Fig. 5 is a sectional view taken along line 5—5 of Fig. 3;

Fig. 6 is a partial elevational view in position of use of the instrument of Fig. 1 viewed from the right of Fig. 1;

Fig. 7 is a sectional view on an enlarged scale taken along line 7—7 of Fig. 1;

Fig. 8 is a sectional view taken along line 8—8 of Fig. 7;

Fig. 9 is an enlarged sectional view taken along line 9—9 of Fig. 6; and

Fig. 10 is an exploded perspective view of details of construction of parts shown in Figs. 3 and 5.

Although it appears probable that recognition of the physical-geometric fact that an ellipse can be drawn by mechanically projecting an inclined circle onto a plane is basic to the invention of a commercially practicable ellipse drawing instrument, this alone is not sufficient to meet requirements of a practicable instrument. As attested by numerous past failures and inadequate successes to be found in the art, successful practice requires the discovery of means of providing and adjusting the tiltable circle, of means of mechanically projecting the circle to form an ellipse, and of means to amplify and project the basic ellipse without distortion, all with the necessary flexibility, simplicity, and structural form to make the instrument practicable for manufacture. It is believed that the instrument of this invention is the first which has the necessary basic characteristics to accomplish these purposes.

This invention consists fundamentally in the recognition and effective and practical implementation of two possibilities:

First, the circle to be projected need not be provided as a physically real and continuously existent part, but can best be provided by generating and projecting it simultaneously, point by point. In other words, the circle, like the ellipse to be amplified and projected, need be merely a geometrical locus of points. For this purpose, a tiltable circular ring is provided with a yoke riding freely yet securely around the periphery of the ring, a suitable point on the yoke generating the circle as the yoke is rotated 360 degrees around the periphery of the ring; and a suitably associated point simultaneously generates the ellipse to be projected, this point being located on a line with the generating point on the yoke, this line being imaginary and always parallel to the (vertical or central) axis of the instrument, and the generated ellipse lying in a plane perpendicular to the axis of the instrument and parallel to the drawing surface onto which the amplified (greater or smaller) ellipse is projected and scribed. The adjustably tilted ring is supported on the upper part of the axis of the instrument, this axis passing vertically (to the plane on which the ellipse is scribed) through the center of the generated circle and the "center" of the generated ellipse and the "center" of the amplified scribed ellipse. This basic arrangement makes possible several of the highly desirable features of this instrument; which features will be set forth in the detailed description of the instrument.

Second, the axis of the instrument need not be physically real throughout its full length, but may be an imaginary or purely geometrical axis throughout most of its length. This makes possible the structure shown in the drawings and set forth in detail in the particular description of the instrument. The entire instrument, with the exception of the real upper part of the instrument axis on which is supported the adjustably tiltable ring and the ellipse major axis positioning rod (described later), can thus be rotated about its imaginary axis which terminates on the drawing surface at the "center" of the ellipse being drawn. This permits a general strength, rigidity, lightness and simplicity not otherwise attainable, and makes possible a great simplification of most of the working parts of the circle-following, projection and amplification systems compared with any previous instrument in the art. Many particular features of the instrument, as set forth in the particular description following, are believed, also, to be novel.

Referring to the drawings, the central axis A—A of the instrument is defined by a straight line passing through the centers of the circular cross sections of shaft ends 10 and 11 extending radially at diametrically opposite points from flanges 12, 13 secured to a central axis shaft piece or ring member 14, through the central plane of the ring member 14 and the imaginary or geometrical projection of this axis A—A downward to the drawing surface S passes it through the center of the locating point 15 mounted in a horizontally extending support 16 of a frame, this center being the "center" of the ellipse to be drawn on the surface S.

A tiltable ring 17 is supported from the ring member 14 for guided angular positional shift on an axis intersecting and perpendicular to the central axis A—A and in a plane at right angles to the central plane of ring member 14. Ring 17 is supported from ring member 14 by radially extending brackets 18 and 19 secured respectively at 20 and 21 to diametrically opposite points of the ring 17. Bracket 18 has a widened circular flange 22 engageable with a side face of ring member 14 and a reduced circular portion 23 fitting snugly but movably within the central hole 14a of ring member 14. A centrally located hole 24 is provided in flange 22 and portion 23. Bracket 19 has a widened circular flange 25 engageable with the other side face of ring member 14 and a centrally located stud or extension 26 rotatively fitting the hole 24. The angular tilt of the plane of ring 17 is guided by the engagement of flanges 22 and 25 with opposite side faces of central axis shaft piece or ring member 14 and the ring 17 may be fixed in any adjusted position by tightening of a thumbscrew 27 threadedly engaged in the ring 14 and actuating a clamping block 28 provided in a recess 29 in ring 14 adjacent the peripheral wall of circular portion 23 of bracket 18.

A frame part of member 30 of substantially square or rectangular section extends vertically upwardly of the horizontal support portion 16, being marked on a face with an appropriate graduated scale to be used as hereafter described for setting the dimensions of the major axis of the ellipse to be drawn. Vertically extending frame part or member 30 is bent laterally at 31 and then again upwardly in the vertical extension 32. A yoke 33 is slidably guided for movement on the member 30 below its laterally bent portion 31, being adjustable along the length of member 30 in relationship to the scale on the latter. A set or thumbscrew 34 acts to fix the yoke in any adjusted position on member 30 with reference to its scale. A pair of parallely directed pivot arms 35 extend from an end of yoke 33 (Fig. 9). These arms 35, in turn, are rotatively secured as by pivot screws 36 to opposite side faces of a tubular sleeve 37. The outer tube 38 of an amplifying telescoping lever 39 is slidably borne in sleeve 37 and the telescoping rod 40 working in tube 38 is secured to a yoke 41 pivoted at 42 to a scriber carrying a slide member 43. The latter member 43 is slidably guided on a substantially horizontally extending bar 44, secured at one end to a lateral extension 45 of the frame part or member 30. The scriber 46 is carried by a member 47 that is adjustable longitudinally of the slide member 43 as by a screw 48. The dimensions of yoke 33 and its arms 35 are such that the center point of the axis defined by pivot screws 36 is intersected by the central axis A—A of the instrument. The center point of the axis defined by pivots 42 is intersected by the vertically upward projection of the axis of the point of scriber 46 in normal usage. If this screw 48 is operated to change the alinement of the point of scriber 46 relative to the center point of the axis defined by pivots 42, as may be desired occasionally, the figure traced out by the scriber 46 while related will not be a true ellipse.

The support 16 is recessed on the face directed toward arm 47 so that the inner end of the latter may be moved to a very close position relative to the center point 15 to correspondingly permit close proximation of scriber 46 relative to center point 15 for facilitating the drawing of very narrow ellipses.

The upper end of amplifier lever tube 38 is secured pivotally at 49 to a sleeve 50 mounted slidably on a substantially horizontally extending guide bar or arm 51, the latter, in turn, being secured to the vertical extension 32 of the frame part or member 30. A second substantially horizontal guide bar or arm 52 is secured to the extension 32 above bar 51 being coplanar and parallel with the latter. A sleeve 53 is guided slidably on the bar 52. Sleeves 50 and 53 are interconnected by the pair of substantially vertical crossbars 54 so that the two sleeves will move in unison on their respective guide bars 51 and 52. A crossarm 55 is slidably mounted for vertical travel on the crossbars 54 and is provided with a pair of oppositely extending knobs 56 for purposes presently to be described.

The parallelly extending, coplanar, substantially horizontal arms 51 and 52 have a pair of axially alined bearings 51a and 52a at their outer ends in which the respective shaft ends 10 and 11 are rotatively carried so as to support the central axis shaft piece or ring member 14 with its central plane substantially vertical and intersecting the axis A—A. Shaft end 11 at 11a extends through and beyond bearing 52a and rotatively through a bushing 57 of a knurled knob 57a and beyond the knob 57a to serve as a mount for a shaft or stud extension 58 which is fixed at 58a to the projecting portion 11a of shaft end 11. The bushing 57 of the knurled manipulating knob 57a is coupled to arm 52 as by pins 52b.

The stud extension 58 has a transversely extending hole 59 whose axis is arranged to lie at right angles to the plane of ring member 14. An axis locating leg member 60 having a horizontally extending portion 60a secured in the hole 59 extends downwardly, terminating in a point 61 engageable with the drawing surface S is provided for purposes presently to be described.

The ring 17 has an annular peripheral groove 17a which snugly but slidably receives a yoke ring 62. A coupling stud 63 extending radially outwardly of the ring 62 is provided for coupling the ring 62 to the crossbar 55. This stud 63 (Fig. 10) has an annular groove 64 adjacent its outer end defining a head 65 on the end of the stud 63. A pair of bearing blocks 66, 67 having inner semicylindrical recesses complemental in shape to the outer surfaces of the head 65, groove 64 and body of stud 63 adjacent its head end are fitted around the head end of the stud and are secured together as by bolts 68 (Fig. 5), to permit axial rotation of stud 63 but to preclude longitudinal withdrawal of the latter from the bolt secured blocks 66 and 67 by reason of the engagement of the internally raised portions 66a and 67a thereof which engage in groove 64.

A horizontally extending rod or yoke member 69 has a pair of parallelly extending arms 70 spaced apart to receive the bolt secured bearing blocks 66 and 67 and is pivotally secured to these blocks by threaded pins 71 which extend into axially alined holes 66b and 67b in the blocks so that the member 69 is free to pivot about an axis at right angles to the longitudinal axis of stud 63. The yoke member 69 has a stem portion 69b of substantially circular cross section that is secured with freedom to rotate about its own axis in a complementarily shaped substantially horizontal hole 72 centrally located in a bearing 73 in the crossarm 55.

Operation

The angle of the ellipse to be generated, projected and drawn by scriber 46 on surface S is controlled by adjusting the tilt of ring 17 relative to the axis A—A of the instrument. This is accomplished by loosening thumb screw 27 and tilting ring 17 until the desired angle is read on vernier scales C and Ca. Mark 10 on scale C of member 14 indicates on scale Ca of member 25 or 22 the angle to the nearest ten degrees. Setting to one degree is read in standard vernier scale manner from the appropriate mark on vernier scale C. When desired angle setting is attained, thumbscrew 27 is tightened in its threaded hole in member 14 so that clamping or anti-scoring member 28 is pressed against the reduced portion 23 of the lateral supporting part 22 of the tiltable ring member 17, thus locking it in fixed angular position relative to vertical member 14. The adequate size of these parts, allowing simple, positive, and accurate setting of the angle, is possible only because of the novel technique realized in practical form in this invention of using suitably associated parts simultaneously to generate a circle and an ellipse, allowing the tilt angle of the parts which control the generation of the circle to determine the angle of the generated ellipse; rather than depending as in prior art on the unavoidably unsatisfactory method of some form of surface-contact-following of a "real" circle. It does not appear to be possible in an ellipse drawing instrument of the circle projection genre to provide a comparably accurate, positive and simple angle setting arrangement without using the circle generating method of this invention, with its associated "standoff" arrangement (parts 63, 66, 67, 69, 69b, 70, 72 and 73), which are described fully above.

The projected major axis length of the ellipse to be drawn on surface S is very simply, accurately and positively adjusted by loosening thumbscrew 34 of vertical amplifying lever ratio determining yoke 33, and moving this yoke to the desired position on the scale on vertical bar 30, which can be calibrated directly in inches of major axis length, and then re-tightening thumbscrew 34. The simplicity, accuracy and positiveness of this adjustment mechanism and of the amplifier lever 39 telescoping rod 40 and tube 38 and associated pivot yokes is made possible only by the general structure of the instrument resulting from the use of an imaginary central axis for the instrument in its lower part.

When the instrument has been adjusted to draw a desired ellipse, it is held with one hand by shaft stub 58, and point 15 is placed on the "center" point of the ellipse to be drawn: Point 61, on the end of major axis positioning shaft 60, is placed on the line along which the major axis of the ellipse is to lie, thus acting to locate the central plane of member 14 perpendicular to the desired direction of said major axis; the instrument is held roughly perpendicular (as with a drawing compass, a slight variation of perpendicularity determines bearing pressure of the scribing point on the scribing surface) to the plane of the scribing surface S, and knob 57a is rotated with the fingers of the opposite hand. One complete (360 degree) rotation of knob 57a will cause the instrument to draw the ellipse. Starting point of the operation is not significant. The general similarity of this operation to the use of an ordinary drawing compass is clear.

When the instrument has been adjusted to draw ellipses of an angle of view of an order of magnitude less than ten degrees, rather than using knobs 57a to rotate the generating mechanism, knob or handles 56 should be grasped with the free hand and used to effect the desired rotation. By approximately following manually around the tilted circular ring 17, the unfavorable friction forces can be avoided which would occur between ring 17 and yoke 62 if knob 57a were used in the usual manner.

During the rotation of the parts as effected by rotation of knob 57a or handles 56, the bars 51 and 52 and parts attached thereto rotate about the axis line A—A, while yoke ring 62 slides around in groove 17a of the tilted ring 17, causing the point $x$ (Fig. 5), which is the exact geometrical center of the universal joint constituted by arms 70, blocks 66 and 67 and head 65, to trace out a circle which is really a circular locus of points as the yoke ring 62 is moved about ring 17, and simultanously causing point $y$ in axis 49 of sliding member 50 which is on a straight vertical line with point $x$ (this line being always parallel to instrument axis A—A at a variable distance from it) to generate a basic ellipse in a plane perpendicular to the central axis A—A, and also causing amplifying lever yoke 50 to slide reciprocally on bar 51, with consequent reciprocal pivoting of the amplifying lever 39 about the pivot of yoke 33 and reciprocal telescoping slide of rod 40 in tube or sleeve 38 and pivoting of coupler 41 and reciprocal slide of yoke 43 on bar or rod 44 so that scriber 46 traces out the desired ellipse on surface S which is the amplified projection of the basic ellipse generated by point $y$.

During the rotation of ring yoke 62 around groove 17a the point $x$ in stud 63 generates an imaginary circular locus as the yoke ring 62 is rotated 360 degrees around the groove 17a and the point $y$ at junction of axis 49 and axis of rod 51 simultaneously generates the basic ellipse to be projected which is an imaginary locus of points, also, and the generated basic ellipse is amplified by telescoping member 39 and scribed by the scriber 46 on the surface S.

It is to be noted that the amplifying and projecting mechanism including pivots 49, arm 51, slide 50, yoke 33, telescoping lever 39, sleeve 37, slide 43 and arm 44 define opposite similar right triangles whose vertical legs are the distances measured along the central axis A—A respectively between the plane of surface S and the pivot 36 and between the latter and the center point of biasing 51a, whose lateral legs are respectively the distance horizontally between the central axis A—A and the center point of pivot 42 and the distance horizontally between the central axis A—A and the center of the axis of pivots 49 and whose hypotenuses are respectively the length of lever 39 between the center point of pivot axis 42 and the center point of pivot axis 36 and between the latter and the center point of pivot axis 49. Thus, for any adjustment of yoke 33 on member 30 the ratio of the vertical leg lengths is fixed as is the ratio of the lateral leg lengths and the controlling hypotenuses of the two triangles lie on the same straight line which is the axis of the telescoping amplifying lever 39.

While a specific embodiment of the invention has been disclosed, variations in structural detail within the scope of the claims are possible and are contemplated. There is no intention, therefore, of limitation to the exact details shown and described.

What is claimed is:

1. An ellipse-drawing instrument of the class involving circle projection, comprising a locating point, a support therefor, adjustable means including a frame part extending upwardly of the support, coplanar, parallelly extending arms secured to said frame part and arranged to intersect the axis of the locating point, a flat and planar member supported by said arms coaxially with said locating point, a ring member tiltably attached to said flat and planar member and linked mechanisms coupled with said ring member that simultaneously generate a circle lying in a plane at a desired angle with respect to a scribing surface and an ellipse whose major axis length is equal to the diameter of the circle with the ellipse lying in a plane parallel to and above the scribing surface, the angle of view of the generated ellipse being determined by the setting of control parts of said adjustable means which control the tilt of the plane of the generated circle relative to the scribing surface, mechanism for following the aforesaid ellipse and for amplifying the same and scribing means connected to said last named mechanism.

2. An ellipse-drawing instrument of the class involving circle projection, comprising a locating point, a support therefor, a frame part extending upwardly of the support, coplanar, parallelly extending arms secured to the frame part and arranged to intersect the axis of the locating point, a central axis shaft piece that is substantially flat and planar and supported by said arms coaxially with said locating point, a circular ring member tiltably attached to said axis shaft piece, a yoke riding on the ring so that a determined point on the yoke generates a circular locus of points in a plane fixed at a desired angle relative to the axis of the instrument, mechanism coupled to said yoke for generating an associated ellipse, and means coupled to said mechanism for amplifying and projecting the ellipse and scribing it on a surface.

3. An ellipse-drawing instrument of the class involving circle projection, comprising means including a locating point, a support therefor, a frame part extending upwardly of said support, coplanar, parallelly extending arms secured to the frame part and arranged to intersect the axis of the locating point, a flat and planar member supported by said arms coaxially with said locating point, and a ring member tiltably attached to said flat and planar member for simultaneously generating a circle in a plane tilted at any desired angle between 0° and 90° relative to the axis of the instrument and a basic ellipse in a plane perpendicular to said last-named axis and above the scribing surface, the two generating points lying on a straight line which is always parallel to said last-named axis, means for linking the two points and for following the generated basic ellipse, amplifying and projecting it, and means for scribing the amplified projection of said basic ellipse on a surface.

4. An ellipse-drawing instrument of the class involving circle projection, comprising a central axis shaft piece, a circular ring tiltably attached to said piece, a yoke riding on said circular ring, a horizontal follower rod, a universal joint attaching said rod to said yoke, said horizontal follower rod being precluded from any tilt out of a horizontal plane, and said rod being so supported that its axis always points directly at the central axis of the instrument, its projection intersecting said central axis, the exact geometrical center of said universal joint providing a point which generates a circular locus of points as the yoke is moved around the ring, and means coupled to the follower rod for generating a basic ellipse simultaneously with the generation of said circular locus of points, and means for projecting and amplifying the said basic ellipse and for scribing the amplified projection as an ellipse on a scribing surface.

5. The instrument of claim 4 in which the means for generating the basic ellipse include vertical guides rotatable around the central axis of the instrument and a member free to move vertically on the guides supporting said horizontal follower rod, and means for mounting said vertical guides to always extend parallel with the central axis of the instrument.

6. The instrument of claim 5 in which the means for generating the basic ellipse include horizontal guides rotatable horizontally around the central axis of the instrument and on which said vertical guides are movable toward and away from said central axis.

7. The instrument of claim 4 in which the amplifying and scribing means include a horizontal guide adjacent the lower end of the instrument, a sleeve slidable on this guide toward and away from the central axis of the instrument, a scriber carried by said sleeve and movable therewith into close proximity to said central axis.

8. The instrument of claim 4 wherein said circular ring is attached to said central axis shaft piece, the lower part of said central axis between the supports for said circular ring and said scribing means being an imaginary straight line projection of the upper portion of said central axis terminating on the scribing surface at the center of the ellipse to be scribed thereon.

9. An ellipse-drawing instrument comprising a locating point, a support therefor, a frame part extending upwardly of the support, coplanar parallelly extending arms secured to said frame part and arranged to intersect the axis of the locating point, a substantially flat and planar member supported by the arms coaxially with said locating point, a ring member, means for adjustably supporting said ring member from said first-named member for rotative adjustment on an axis perpendicular to said first-named member, said last-named axis intersecting the axis of said locating point, a yoke ring mounted for sliding movement around the periphery of said ring member, means to maintain said first-named member extending perpendicular to the direction of the major axis of the ellipse to be drawn, a scriber, and means coupling the scriber to said yoke ring whereby the scriber draws the ellipse as said yoke ring is slid around the periphery of said ring member.

10. The instrument of claim 9 wherein the support is recessed to permit close proximation of the scriber with the locating point for scribing of narrow ellipses.

11. The instrument of claim 9 including a support for the scriber, horizontal guide means for the latter-named support and means for adjusting the position of the scriber on its support toward and away from the axis of the locating point.

12. An ellipse-drawing instrument comprising a rigid frame having a vertical portion and a horizontal support portion positioned to lie in proximity to the surface on which an ellipse is to be drawn, a locating point mounted on said horizontal support portion, a horizontal guide secured to said vertical portion in proximity to said horizontal support portion, a slide member slidably carried on said horizontal guide, a scriber supported from said slide member, a yoke member slidably mounted on said vertical portion of said frame for adjustable positioning thereon at a desired level above said horizontal support portion, a telescoping amplifier lever pivotally secured to said slide member, a slide on said telescoping lever pivotally secured to said yoke member, a pair of horizontally extending guide arms secured to a vertical extension of the vertical portion of said frame, horizontally movable yokes mounted slidably on said arms, vertical guide rods connecting said last-named yokes, a crossbar mounted in said guide rods for vertical movement thereon, a horizontally extending rod fixed to said crossbar, a planar central axis shaft piece supported between alined ends of said guide arms with its central plane in the vertical projection of said locating point and rotatable on an axis defined by said vertical projection, a tiltable ring member supported by said central axis shaft piece with its plane perpendicular to the plane of the latter and with the tilting axis perpendicular to and intersecting said vertical projection, a ring yoke mounted to slide around said ring member, a stud extending from said yoke, a universal joint coupling said stud to said horizontally extending rod, means for positioning and maintaining the central plane of said central axis shaft piece perpendicular to the direction of the major axis of the ellipse to be drawn, and means for rotating said frame and said ring yoke to slide the latter around said tiltable ring whereby the scriber scribes an ellipse on said scribing surface whose minor axis is determined by the angle of tilt of said tiltable ring and whose major axis is determined by the adjusted postion of the yoke member on said vertical portion of said frame.

13. An ellipse-drawing instrument comprising a support, a locating point member extending from the support, a member extending upwardly of the support, a pair of coplanar parallelly extending arms secured to said upwardly extending member, bearings in said arms axially alined with said locating point member and whose centers with the axis of the locating point member define the central axis of said instrument, a ring member having oppositely extending shaft ends rotatively mounted in said bearings so that said central axis is coextensive with the plane of said ring member extending diametrically across the latter, a second ring member, means for adjustably supporting said second ring member for rotatable adjustment of its plane on an axis intersecting said central axis and perpendicular to the plane of said first-named ring member, a yoke ring member mounted for slidable movement around the periphery of said second ring member and having a projection, a vertically movable rod supported for vertical movement between the pair of arms and reciprocally of the axial direction of said arms, coupling means connecting said rod and projection, a leg member coupled to the one of the shaft ends of said first-named ring member to locate the plane of the latter to extend perpendicular to the major axis of the ellipse to be drawn, and having a point engageable with a surface on which the said ellipse is to be drawn to so maintain the said plane of said first-named ring member during drawing of the ellipse, a scriber, and adjustable amplifying means coupling the scriber to said rod whereby the scriber draws the ellipse on said surface as the yoke ring member is moved about the periphery of said second-named ring member.

14. The instrument of claim 9 wherein the coupling means include ellipse generating means and amplifying means between said last named means and said scriber.

15. A drawing instrument of the class involving circle projection, comprising a locating point, a support therefor, adjustable means including a frame part extending upwardly of the support, coplanar, parallelly extending arms secured to the frame part and arranged to intersect the axis of the locating point, a flat and planar member supported by said arms coaxially with said locating point, a ring member tiltably attached to said flat and planar member, and linked mechanism coupled with said ring member that simultaneously generate a circle lying in a plane at a desired angle with respect to a scribing surface and an ellipse-like figure lying in a plane parallel to and above the scribing surface, the angle of view of the generated ellipse-like figure being determined by the setting of control parts of said adjustable means which control the tilt of the plane of the generated circle relative to the scribing surface, adjustable amplifying mechanism for following the said ellipse-like figure and scribing means connected to said amplifying mechanism.

JAMES W. DIBRELL.

References Cited in the file of this patent

UNITED STATES PATENTS

| Number | Name | Date |
|---|---|---|
| 817,645 | Keel | Apr. 10, 1906 |
| 1,026,560 | Burke | May 14, 1912 |
| 2,393,698 | Moen | Jan. 29, 1946 |
| 2,493,229 | Dibrell et al. | Jan. 3, 1950 |

FOREIGN PATENTS

| Number | Country | Date |
|---|---|---|
| 143,266 | Austria | Oct. 25, 1935 |
| 436,830 | Great Britain | Oct. 18, 1935 |
| 597,113 | France | Aug. 21, 1925 |